United States Patent
Suzuki et al.

(10) Patent No.: US 8,315,008 B2
(45) Date of Patent: Nov. 20, 2012

(54) MAGNETIC DISK DEVICE AND HEAD POSITION CONTROL METHOD

(75) Inventors: Atsushi Suzuki, Tokyo (JP); Masafumi Iwashiro, Tokyo (JP); Masahide Yatsu, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 86 days.

(21) Appl. No.: 13/028,775

(22) Filed: Feb. 16, 2011

(65) Prior Publication Data

US 2011/0310506 A1  Dec. 22, 2011

(30) Foreign Application Priority Data

Jun. 18, 2010 (JP) ................................. 2010-139869

(51) Int. Cl.
*G11B 5/596* (2006.01)
*G11B 19/04* (2006.01)

(52) U.S. Cl. ........................ 360/77.04; 360/60
(58) Field of Classification Search .................. None
See application file for complete search history.

(56) References Cited

U.S. PATENT DOCUMENTS

| | | | |
|---|---|---|---|
| 6,507,449 B1 * | 1/2003 | Sutardja | 360/77.02 |
| 6,751,046 B1 * | 6/2004 | Szita et al. | 360/77.04 |
| 7,529,058 B2 * | 5/2009 | Hara et al. | 360/77.06 |
| 7,679,856 B2 * | 3/2010 | Ishiguro | 360/75 |
| 7,724,457 B2 * | 5/2010 | Dang et al. | 360/77.02 |
| 7,729,078 B2 * | 6/2010 | Kawabe | 360/71 |
| 7,751,143 B2 * | 7/2010 | Yamamoto et al. | 360/77.02 |
| 7,760,456 B2 * | 7/2010 | Ding et al. | 360/60 |
| 7,933,091 B2 * | 4/2011 | Uchida et al. | 360/77.04 |

FOREIGN PATENT DOCUMENTS

| | | |
|---|---|---|
| JP | 3597307 B | 9/2004 |
| JP | 3695944 B | 7/2005 |
| JP | 2007-335011 | 12/2007 |

* cited by examiner

*Primary Examiner* — Hoa T Nguyen
*Assistant Examiner* — James L Habermehl
(74) *Attorney, Agent, or Firm* — Patterson & Sheridan, LLP

(57) ABSTRACT

According to one embodiment, a magnetic disk device includes a magnetic disk, a magnetic head, a position error signal output module, a vibration pattern detector, an adder, and a head positioning controller. The magnetic head moves over the magnetic disk. The position error signal output module outputs a position error signal based on a difference between a head position of the magnetic head over the magnetic disk and a target position on the magnetic disk. The vibration pattern detector detects a vibration pattern of the magnetic head caused by vibration. The adder adds the position error signal to an offset signal indicating amplitude of the vibration pattern. The head positioning controller moves the head position to the target position based on a result of addition by the adder.

6 Claims, 8 Drawing Sheets

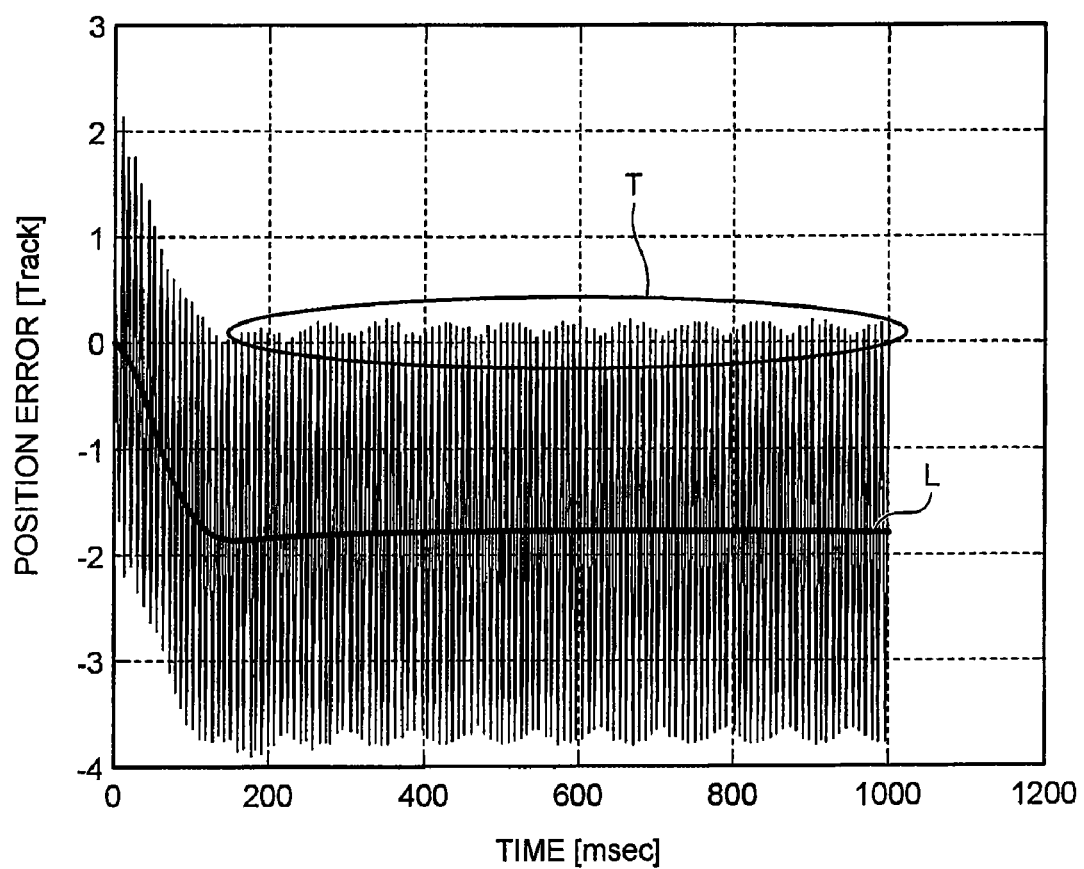

MAGNETIC DISK DEVICE AND HEAD POSITION CONTROL METHOD

CROSS-REFERENCE TO RELATED APPLICATIONS

This application is based upon and claims the benefit of priority from Japanese Patent Application No. 2010-139869, filed Jun. 18, 2010, the entire contents of which are incorporated herein by reference.

FIELD

Embodiments described herein relate generally to a magnetic disk device and a head position control method.

BACKGROUND

Generally, information devices such as a personal computer (PC) use a magnetic disk device such as a hard disk drive (HDD). Such a magnetic disk device is provided with a servo control system that controls the position of a magnetic head over a magnetic disk (hereinafter, referred to as "head position"). The servo control system is configured to control the head position of the magnetic head to follow a track that is an access target (target position) in an on-track state.

If vibration is applied to the magnetic disk device, the vibration also affects the magnetic head. Therefore, it is an issue for the servo control system to improve vibration-proof performance. There has been disclosed a conventional technology to reduce the influence of external vibration on the magnetic head by determining the head position using a filter specialized for the frequency characteristics of the external vibration.

With the conventional technology, if a position error (vibration) is caused at the head position of the magnetic head by the vibration applied, the center of the vibration is controlled to be the target position. This may degrade the performance in writing or reading data depending on the velocity of the magnetic head when passing the target position.

BRIEF DESCRIPTION OF THE SEVERAL VIEWS OF THE DRAWINGS

A general architecture that implements the various features of the invention will now be described with reference to the drawings. The drawings and the associated descriptions are provided to illustrate embodiments of the invention and not to limit the scope of the invention.

FIG. 3 is an exemplary chart for explaining a corrective operation for head position by an offset signal in the embodiment;

DETAILED DESCRIPTION

In general, according to one embodiment, a magnetic disk device comprises a magnetic disk, a magnetic head, a position error signal output module, a vibration pattern detector, an adder, and a head positioning controller. The magnetic head is configured to move over the magnetic disk. The position error signal output module is configured to output a position error signal based on a difference between a head position of the magnetic head over the magnetic disk and a target position on the magnetic disk. The vibration pattern detector is configured to detect a vibration pattern of the magnetic head caused by vibration. The adder is configured to add the position error signal to an offset signal indicating amplitude of the vibration pattern. The head positioning controller is configured to move the head position to the target position based on a result of addition by the adder.

Figure 1:
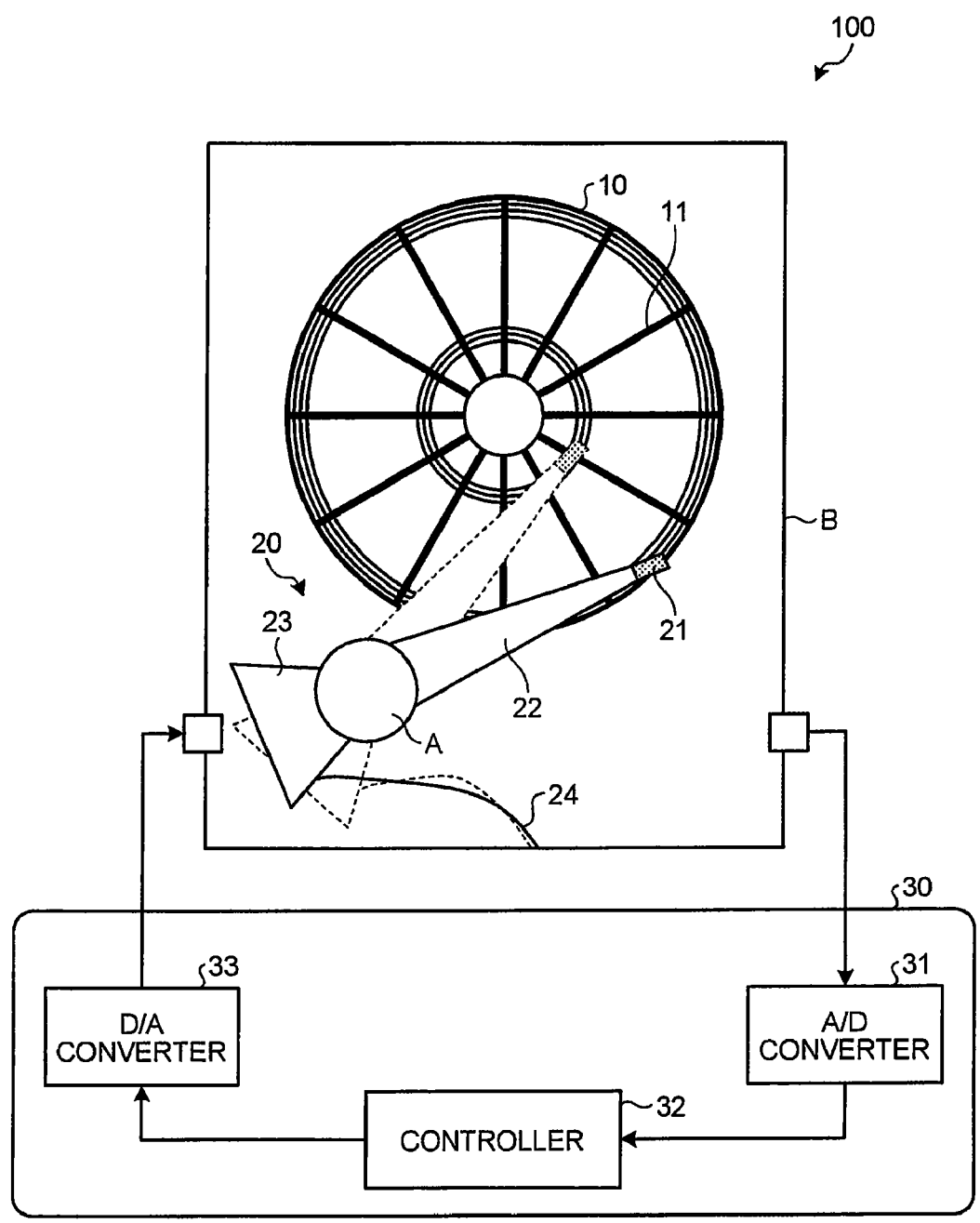
FIG. 1 is an exemplary schematic diagram illustrating a functional structure of a magnetic disk device according to an embodiment.

FIG. 1 schematically illustrates the functional structure of a magnetic disk device 100 according to an embodiment. As illustrated in FIG. 1, the magnetic disk device 100 comprises an actuator 20 and a hard disk drive (HDD) controller 30 that realizes a servo control system, which will be described later. The actuator 20 is provided with mechanisms such as a magnetic disk 10 provided on a base B, a magnetic head 21, an arm 22, a voice coil motor (VCM) 23, and a flexible substrate 24.

There is provided at least one magnetic disk that is rotated at high speed by a spindle motor (not illustrated). Servo data 11 is magnetically written to the magnetic disk 10 radially from the center of the magnetic disk 10 in the radius direction. In the servo data 11, position information of a track is embedded in advance and, a data sector for recording data is provided between the servo data 11.

In the actuator 20, the magnetic head 21 is held at an end of the arm 22. The magnetic head 21 reads the position information of the track from the servo data 11 recorded on the magnetic disk 10 and outputs it to an analog-to-digital (A/D) converter 31, which will be described later. The magnetic head 21 also writes or reads data to or from the track of the access target on the magnetic disk 10 (hereinafter, referred to as "target position").

The arm 22 rotates about a shaft A by a driving force of the VCM 23 and moves the magnetic head 21 in the radius direction of the magnetic disk 10. The VCM 23 comprises a magnet and a drive coil (not illustrated) and drives the arm 22 in response to a drive current fed from a digital-to-analog (D/A) converter 33, which will be described later. The flexible substrate 24 fixed to connect the actuator 20 and the base B of the magnetic disk 10 is used to transfer data read from the magnetic disk 10, data to be written to the magnetic disk 10, and the like.

The HDD controller 30 comprises, as illustrated in FIG. 1, the A/D converter 31, a controller 32, and the D/A converter 33. The A/D converter 31 converts from analog to digital the position information of the track read from the servo data 11 of the magnetic disk 10 by the magnetic head 21 and outputs it to the controller 32. In other words, the A/D converter 31 feeds the digitalized current head position of the magnetic head 21 to the controller 32 as a head position signal.

The controller 32 is constituted by a microprocessor or the like. The controller 32 performs servo control that makes the head position of the magnetic head 21 over the magnetic disk 10 follow the target position based on the head position signal received from the A/D converter 31 and a target position signal indicating the target position on the magnetic disk 10. The operation performed by the controller 32 will be described later.

Figure 2:
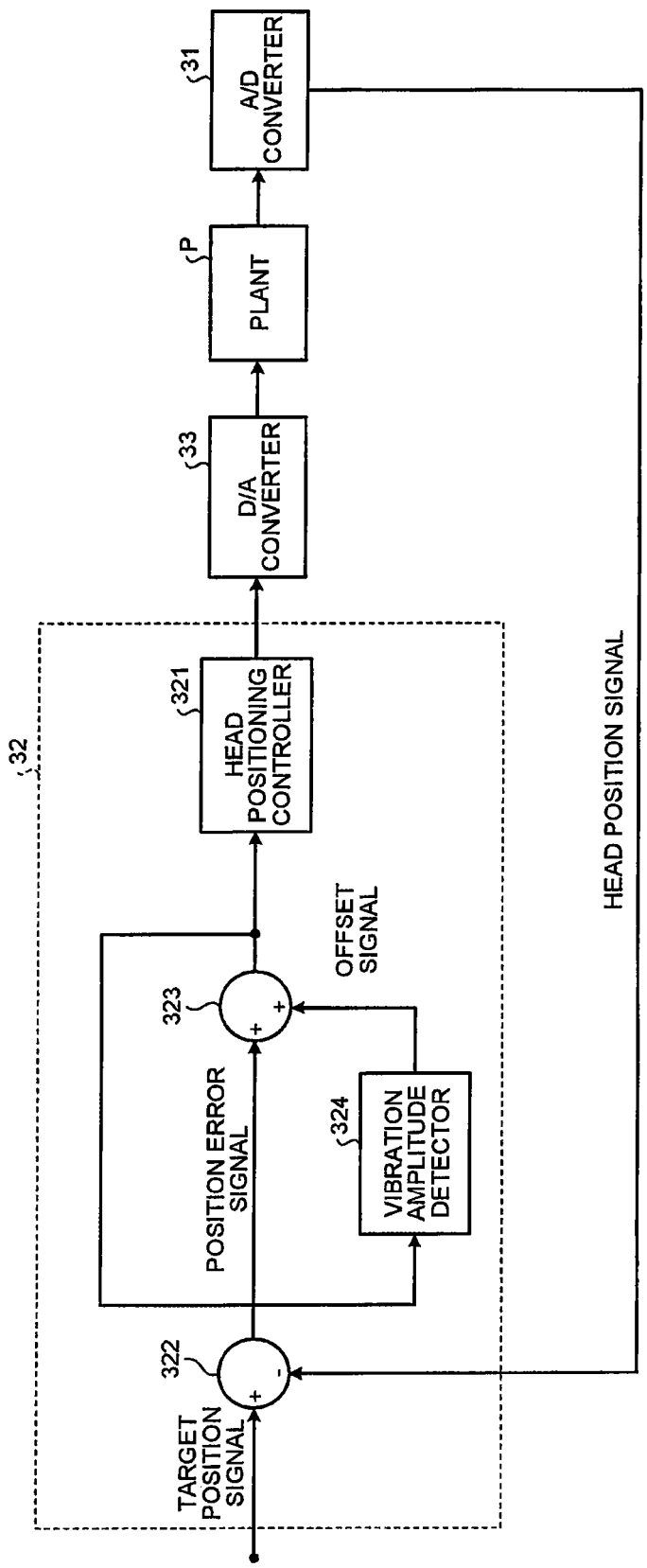
FIG. 2 is an exemplary schematic diagram of a servo control system of the magnetic disk device in the embodiment.

The D/A converter 33 converts a control signal received from the controller 32 to an analog signal and feeds a driving current to the actuator 20 (VCM 23) in response to the analog signal. With reference to FIG. 2, the servo control system of the magnetic disk device 100 will be explained below.

FIG. 2 schematically illustrates the servo control system of the magnetic disk device 100. In FIG. 2, a head positioning controller 321, a subtracter 322, an adder 323, and a vibration amplitude detector 324 are the functional modules of the controller 32. The head positioning controller 321, the subtracter 322, the adder 323, and the vibration amplitude detector 324 may be configured by hardware such as a logic circuit and a filter circuit, or may be provided in software configuration realized by the collaboration of a microprocessor (not illustrated) provided in the controller 32 and a predetermined program stored in a recording medium such as a read only memory (ROM) (not illustrated).

In FIG. 2, the head positioning controller 321 is a functional module that controls the movement of the magnetic head 21. The head positioning controller 321 outputs a control signal in response to a position error signal, which will be described later, to a plant P via the D/A converter 33. The plant P is a control target of the servo control system. Specifically, it corresponds to transfer characteristics from the actuator 20 being driven by a drive signal received by the VCM 23 and up to the head position of the magnetic head 21 being converted to a digital signal by the A/D converter 31. The magnetic head 21 mounted on an end of the actuator 20 reads the position information from the servo data 11 recorded on the magnetic disk 10. The magnetic head 21 then outputs the position information thus read out to the subtracter 322 as the head position signal via the A/D converter 31.

The subtracter 322 subtracts the head position signal from the target position signal received from outside and outputs the difference as the position error signal. The target position signal is received from, for example, a central processing unit (CPU) or the like of the information equipment in which the magnetic disk device 100 is provided via a bus (not illustrated).

The adder 323 adds the position error signal fed from the subtracter 322 and an offset signal, which will be described later, fed from the vibration amplitude detector 324 and outputs the result of addition to the head positioning controller 321. The head positioning controller 321 outputs the control signal to the D/A converter 33 to control the amount of movement of the magnetic head 21 in response to the position error signal received from the adder 323 so that the head position of the magnetic head 21 follows the target position. The output from the plant P (head position signal) is fed to the subtracter 322 again via the A/D converter 31 to form a feedback loop.

The vibration amplitude detector 324 detects a vibration pattern of the vibration of the magnetic head 21 caused by the vibration applied from outside based on the position error signal fed from the adder 323. The vibration amplitude detector 324 also outputs the offset signal based on the amplitude of the detected vibration pattern to the adder 323.

The term "vibration pattern" as used herein refers to the amount of displacement from the target position that produces periodic (quasi-periodic) vibration centering on the target position. The detecting method of the vibration pattern is not specifically limited. For example, the vibration pattern may be detected from the fluctuation history of the position error signal fed from the adder 323, or may be detected from the history of velocity component or acceleration component obtainable by differentiating each value of the position error signal. Furthermore, the vibration pattern may be detected from the result of integration of absolute values of the position error signal fed from the adder 323.

The vibration amplitude detector 324 may be configured to detect the vibration pattern from a specific frequency band contained in the position error signal or to output the offset signal based on the amplitude of the vibration pattern after detecting the vibration pattern continuously for a predetermined period of time.

As described above, the offset signal output from the vibration amplitude detector 324 is added to the position error signal by the adder 323. Consequently, the position error signal added with the offset signal is corrected in response to the amplitude of the vibration pattern. Meanwhile, if the vibration is not detected, the offset signal of a zero value is output.

With reference to FIG. 3, the correction of the head positioning by the offset signal is explained below. FIG. 3 is a chart for explaining the corrective operation for the head positioning by the offset signal, illustrating the fluctuations of the position error signal output from the adder 323 over time. The vertical axis represents the amount of displacement (track) from the target position (0) and the horizontal axis represents the time elapsed (millisecond) (the same applies to FIGS. 4A, 5A, 6A, and 7A).

When vibration is applied to the magnetic disk device 100 from outside with the magnetic head 21 being in an on-track state, the head position of the magnetic head 21 is vibrated centering on the target position by the action of the vibration. Therefore, the position error signal output from the subtracter 322 exhibits, as illustrated in FIG. 3, a waveform reflecting the vibration applied from the outside.

In this case, the vibration amplitude detector 324 detects the vibration pattern of the vibration caused to the magnetic head 21 from the position error signal and outputs the amplitude (half amplitude) of the vibration pattern as the offset signal (symbol L in FIG. 3) to the adder 323. Meanwhile, in the adder 323, by adding the offset signal received from the vibration amplitude detector 324 to the position error signal, the position error signal is corrected in response to the amplitude of the vibration pattern. The head positioning controller 321 then outputs the control signal to the plant P in response to the position error signal added with the offset signal. This makes the target position of the magnetic head 21 be positioned near the peak position of the vibration pattern (see symbol T in FIG. 3).

At the peak position of the vibration pattern, the moving velocity (velocity amplitude) of the magnetic head 21 becomes a minimum. On the other hand, at the center position of the vibration pattern, i.e., the target position before the correction by the offset signal is made, the moving velocity of the magnetic head 21 becomes a maximum. In other words, the time required for the magnetic head 21 to pass the target position becomes longer if the target position is set at the peak position than if that is set at the center position. Consequently, by setting the peak position of the vibration pattern as the target position, the duration of the time for writing data with respect to the target position can be increased compared to if the target position is set at the center position. This leads to an improved settling time with respect to the target position, thereby improving the performance in writing data.

In general, magnetic disk devices comprise a write inhibit mechanism that inhibits writing data when the moving velocity of the magnetic head exceeds a predetermined threshold value upon writing of data to the target position. As described above, because the moving velocity of the magnetic head 21 becomes a maximum if the target position is set at the center position, the moving velocity of the magnetic head 21 when passing the target position may exceed the threshold value. In this case, writing data is inhibited by the operation performed by the write inhibit mechanism and therefore, the performance in writing data is deteriorated.

On the other hand, in the configuration of the embodiment, as described above, because the peak position of the vibration pattern is set as the target position, the velocity of the magnetic head 21 passing the target position becomes slower than if the target position is set at the center position. As a consequence, the frequency of the operation of the write inhibit mechanism can be reduced, thereby the performance is improved in writing data compared to if the target position is set at the center position.

In FIG. 3, an example is described in which the target position is set at the peak position on the positive side of the vibration pattern. However, it is not limited as such, and the peak position on the negative side (bottom) may be set as the target position. Furthermore, it is preferable that the vibration amplitude detector 324 change a sign of the offset signal, i.e., a sign of the amplitude of the vibration pattern, depending on the moving direction of the magnetic head 21 over the magnetic disk 10. It may be controlled so that the peak position on the positive side or the bottom position of the vibration pattern becomes the center value (track=0) of the track range that is the target position, or becomes a maximum value or a minimum value of the track range.

For example, in FIG. 3, when the magnetic head 21 is moving from the track of a negative value towards the track of a positive value, the vibration amplitude detector 324 sets the sign of the offset signal to positive (+) to make the peak position on the negative side of the vibration pattern set as the target position. In FIG. 3, when the magnetic head 21 is moving from the track of a positive value towards the track of a negative value, the vibration amplitude detector 324 sets the sign of the offset signal to negative (−) to make the peak position on the positive side of the vibration pattern set as the target position. Changing the peak position as the target position depending on the moving direction of the magnetic head 21 makes it possible to smoothly carry out the movement control of the magnetic head 21.

Using the simulation results of FIGS. 4A to 8 of, the results of writing data if the target position is set at the center position and those if the target position is set at the peak position are compared.

With reference to FIGS. 4A, 4B, 5A, and 5B, the simulation results will be explained where a vibration pattern of a sine wave at 90 Hz is generated in the position error signal by applying the vibration that causes the displacement of ±0.5 tracks.

Figure 4A:
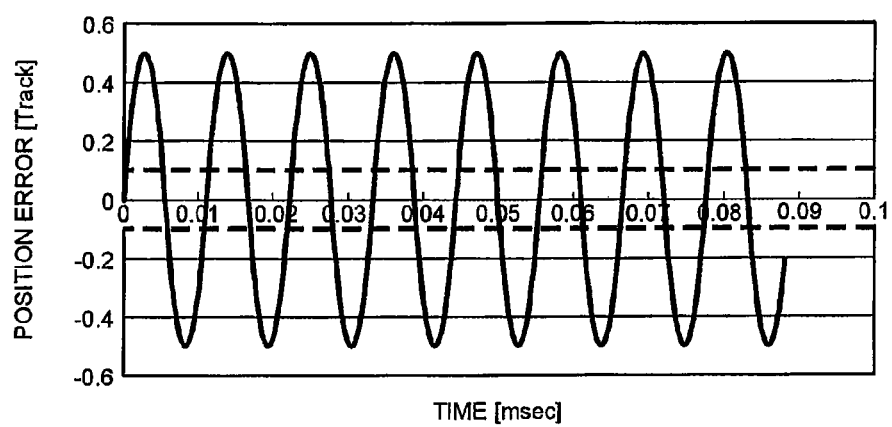
FIG. 4A is an exemplary chart illustrating a simulation result of the vibration pattern of a magnetic head when vibration is applied in the embodiment.

FIG. 4A illustrates the position error signal of the model over time where the target position of the magnetic head 21 is set at the center position of the vibration pattern, and the track range of −0.1 to +0.1 tracks indicated by broken lines corresponds to the target position. The model in FIG. 4A corresponds to the servo control system illustrated in FIG. 2 with the vibration amplitude detector 324 removed.

Figure 4B:
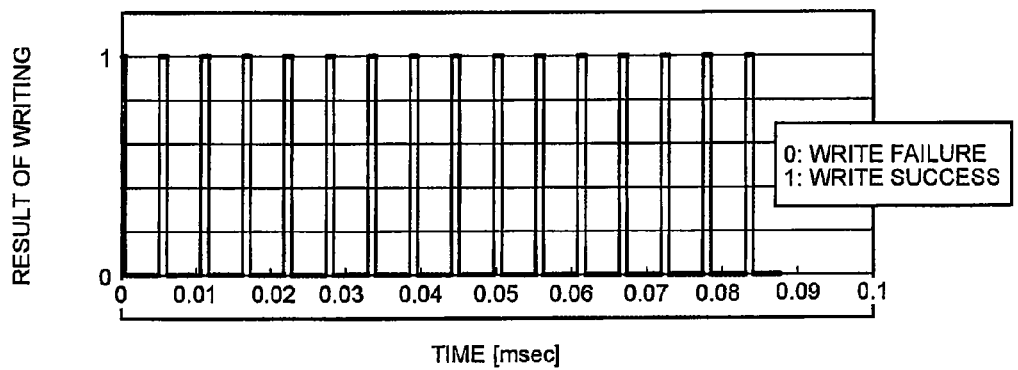
FIG. 4B is an exemplary chart illustrating a result of writing data to a target position under the vibration pattern illustrated in FIG. 4A in the embodiment.

FIG. 4B is a chart illustrating the result of writing data to the target position under the condition illustrated in FIG. 4A. The vertical axis represents the result of writing; 1 means success in writing and 0 means failure in writing. The horizontal axis represents the time elapsed corresponding to that in FIG. 4A.

Figure 5A:
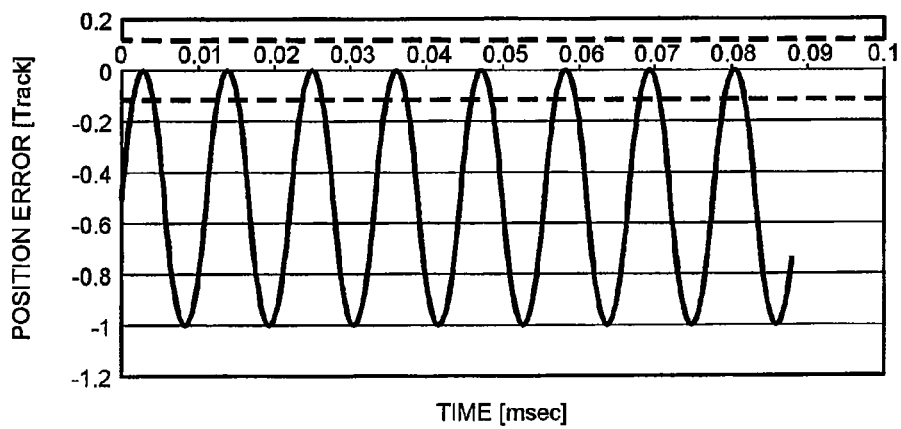
FIG. 5A is an exemplary chart illustrating a simulation result of the vibration pattern of the magnetic head when vibration is applied in the embodiment.
Figure 5B:
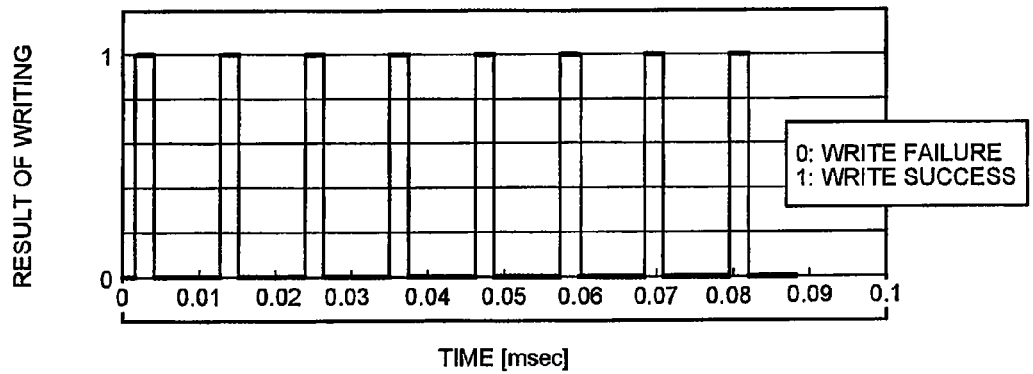
FIG. 5B is an exemplary chart illustrating a result of writing data to a target position under the vibration pattern illustrated in FIG. 5A in the embodiment.

FIG. 5A is a chart of the model where the target position of the magnetic head 21 is set at the peak position on the positive side of the vibration pattern, and the track range of −0.1 to +0.1 tracks indicated by broken lines corresponds to the target position. FIG. 5B is a chart illustrating the result of writing data to the target position under the vibration pattern illustrated in FIG. 5A. The vertical axis in FIG. 5B represents the result of writing and the horizontal axis corresponds to the time elapsed in FIG. 5A.

Comparing the models of FIG. 4A and FIG. 5A, the time required for passing the target position (peak position) is longer in FIG. 5A than that in FIG. 4A. As obvious from the results of writing illustrated in FIGS. 4B and 5B, the time where writing is successful per one cycle of the vibration pattern increases if the target position is set at the peak position of the vibration pattern. Consequently, setting the target position at the peak position of the vibration pattern increases the amount of access per unit time with respect to the target position. This allows the access efficiency with respect to the target position to be improved.

With reference to FIGS. 6A, 6B, 7A, and 7B, the simulation results will be explained where a vibration pattern of a sine wave at 1500 Hz is generated in the position error signal by applying the vibration that causes the displacement of ±0.5 tracks.

Figure 6A:
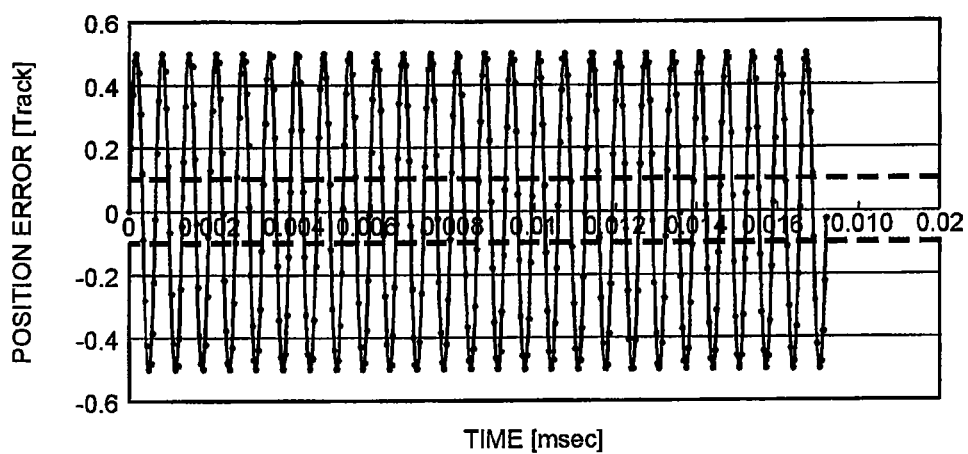
FIG. 6A is an exemplary chart illustrating a simulation result of the vibration pattern of the magnetic head when vibration is applied in the embodiment.
Figure 6B:
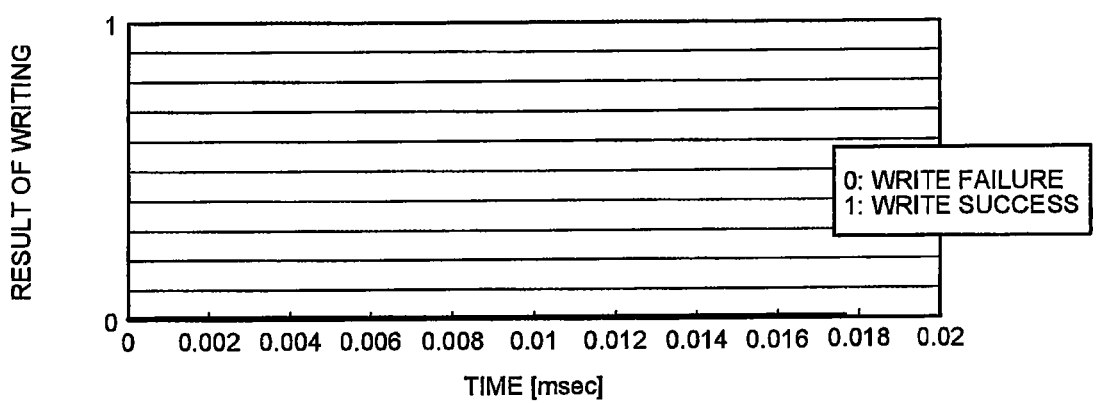
FIG. 6B is an exemplary chart illustrating a result of writing data to a target position under the vibration pattern illustrated in FIG. 6A in the embodiment.

FIG. 6A illustrates the position error signal of the model over time where the target position of the magnetic head 21 is set at the center position of the vibration pattern, and the track range of −0.1 to +0.1 tracks indicated by broken lines corresponds to the target position. FIG. 6B is a chart illustrating the result of writing data to the target position under the vibration pattern illustrated in FIG. 6A. The vertical axis in FIG. 6B represents the result of writing and the horizontal axis corresponds to the time elapsed in FIG. 6A.

Figure 7A:
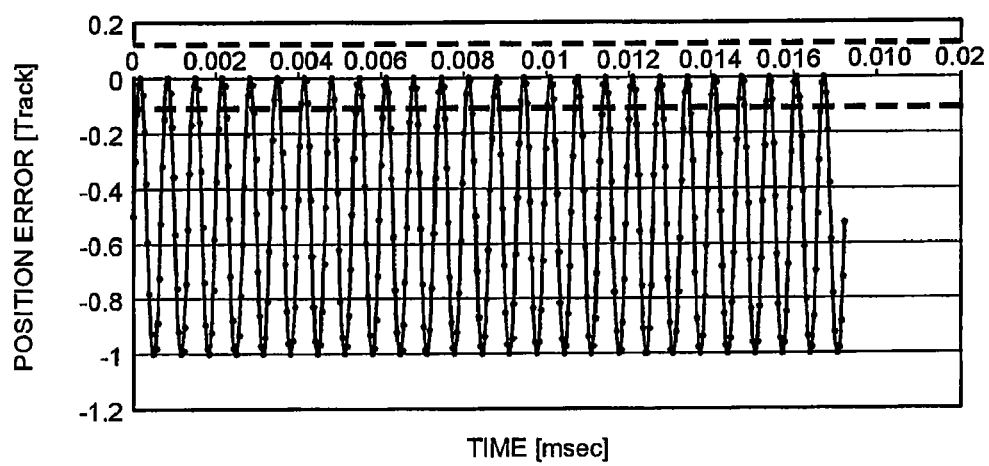
FIG. 7A is an exemplary chart illustrating a simulation result of the vibration pattern of the magnetic head when vibration is applied in the embodiment.
Figure 7B:
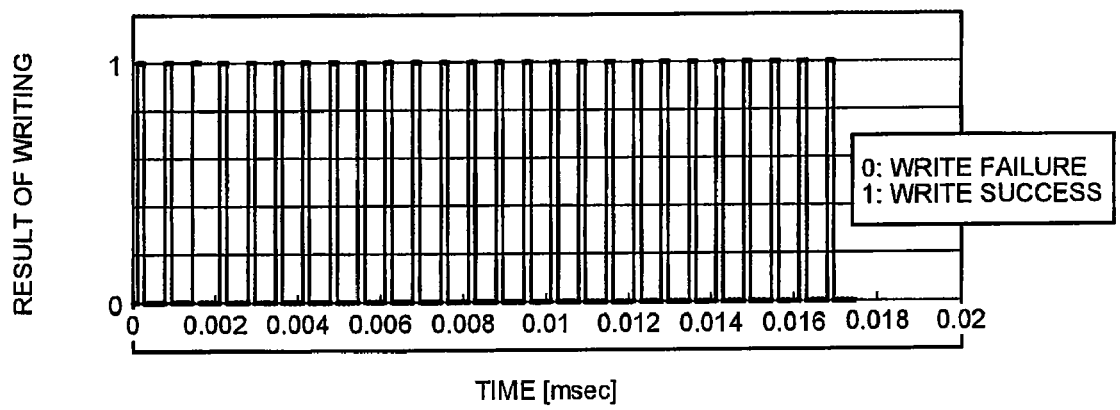
FIG. 7B is an exemplary chart illustrating a result of writing data to a target position under the vibration pattern illustrated in FIG. 7A in the embodiment.

FIG. 7A is a chart of the model in which the target position of the magnetic head 21 is set at the peak position on the positive side of the vibration pattern, and the track range of −0.1 to +0.1 tracks indicated by broken lines corresponds to the target position. FIG. 7B is a chart illustrating the result of writing data to the target position under the vibration pattern illustrated in FIG. 7A. The vertical axis in FIG. 7B represents the result of writing and the horizontal axis corresponds to the time elapsed in FIG. 7A.

Comparing the models of FIGS. 6A and 7A, the velocity of the magnetic head 21 passing the target position is faster in FIG. 6A than that in FIG. 7A. Accordingly, in the result of writing illustrated in FIG. 6B, writing data to the target position is failed over the entire area by the operation performed by the write inhibit mechanism. On the other hand, in FIG. 7B, because the velocity of the magnetic head 21 is slowed at the target position (peak position), the operation performed by the write inhibit mechanism is reduced resulting in successful data writing in each pass of the target position. As a consequence, it makes it possible to improve the performance in writing data.

Figure 8:
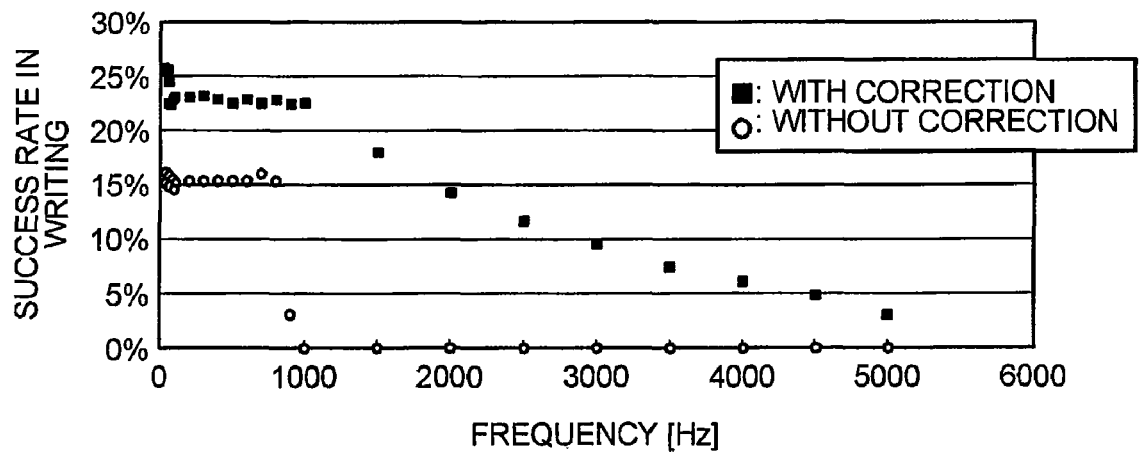
FIG. 8 is an exemplary chart illustrating a success rate in writing data when vibration is applied in the embodiment.

FIG. 8 is a chart illustrating the success rate in writing data when the vibration is applied, including the results of writing of the above models. FIG. 8 illustrates the simulation results of writing data with respect to the target position where the vibration patterns of a sine wave at frequencies of 0 to 6000 Hz are generated to the magnetic head 21 by applying the vibration that causes the displacement of ±0.5 tracks. The vertical axis represents the success rate in writing (percentage) and the horizontal axis represents the frequency of the vibration pattern. The success rate in writing means a ratio of the duration of successful writing per one cycle of the vibration pattern.

As apparent from FIG. 8, in comparison with if the target position of the magnetic head 21 is set at the center position of the vibration pattern (without correction), if the target position is set at the peak position (with correction), the success rate in writing is higher in all frequency bands. In particular, in the frequency band of 1000 to 3000 Hz, the success rate in writing with correction greatly exceeds the success rate in writing without correction. Consequently, by making the target position of the magnetic head 21 correspond to the peak position of the vibration amplitude caused to the magnetic head 21 when an external vibration is applied, the efficiency of writing data with respect to the target position can be improved.

With reference to FIGS. 4A to 8, the operation of writing data with respect to the target position has been explained. However, when data is read, because the time for reading data with respect to the target position can be increased by setting the target position at the peak position of the vibration caused to the magnetic head 21, the performance in reading data can be improved by the configuration described above.

Figure 9:
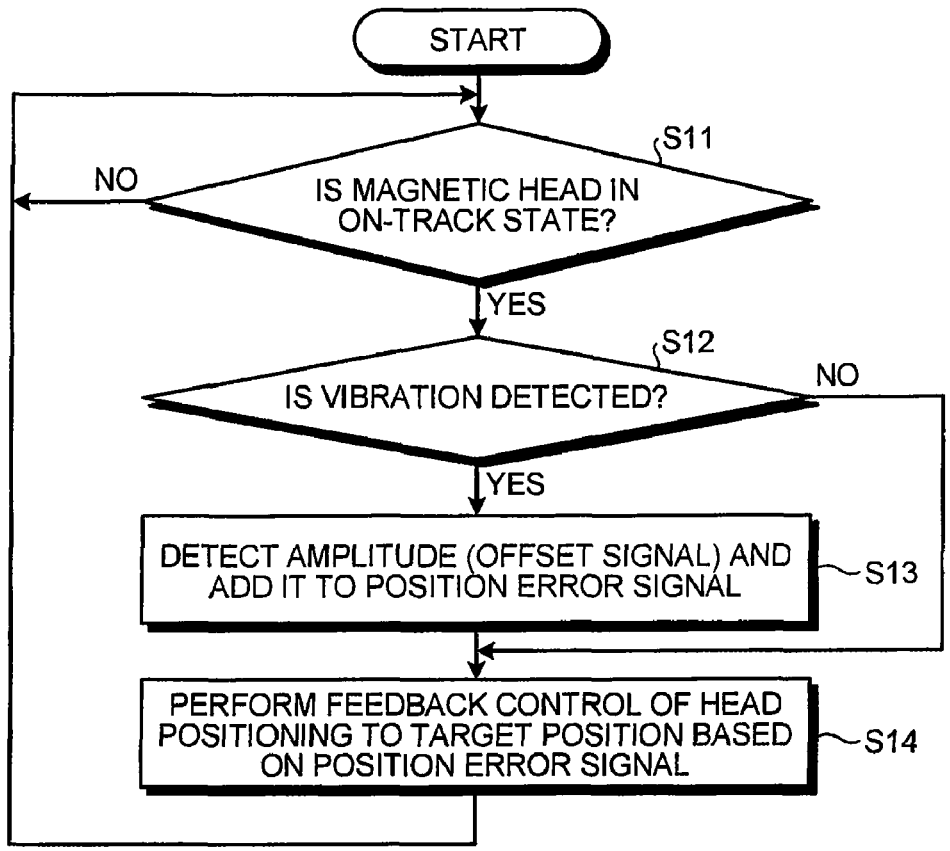
FIG. 9 is an exemplary flowchart of servo control processing in the embodiment.

With reference to FIG. 9, the procedure of servo control processing performed by the controller 32 will be explained. FIG. 9 is a flowchart of the servo control processing that the controller 32 performs.

The controller 32 waits until the magnetic head 21 comes to the on-track state in writing data, reading data, or the like (No at S11). If the magnetic head 21 is determined to be in the on-track state (Yes at S11), the servo control system starts (continues) the control, and the processing moves to S12.

The vibration amplitude detector 324 determines, based on the position error signal fed from the adder 323, whether a vibration pattern is detected (S12). If the vibration pattern is not detected (No at S12), the vibration amplitude detector 324 outputs the offset signal of a zero value to the adder 323, and the processing moves to S14.

On the other hand, if the vibration pattern is detected (Yes at S12), the vibration amplitude detector 324 outputs the offset signal based on the amplitude of the vibration pattern to the adder 323 to add the offset signal to the position error signal (S13).

Subsequently, the head positioning controller 321 generates the control signal based on the position error signal fed from the adder 323 and outputs it to the plant P via the D/A converter 33, whereby the feedback control for the head position of the magnetic head 21 is carried out (S14). The processing then returns to S11 again.

As described above, according to the embodiment, if the vibration pattern is caused to the magnetic head by the vibration applied from outside, by setting the peak position of the vibration pattern as the target position of the magnetic head, the performance in writing or reading data can be improved. This makes it possible to write or read data efficiently.

In the embodiment, although a vibration pattern caused by the vibration application is detected from the position error signal, it is not limited to this. For example, by separately providing a shock detector constituted by a piezoelectric element or the like, the vibration pattern may be detected from a detection signal of the shock detector.

Moreover, the various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic disk device comprising:
   a magnetic disk;
   a magnetic head configured to move over the magnetic disk;
   a position error signal output module configured to output a position error signal based on a difference between a head position of the magnetic head over the magnetic disk and a target position on the magnetic disk;
   a vibration pattern detector configured to detect a vibration pattern of the magnetic head caused by vibration;
   an adder configured to add the position error signal to an offset signal indicating amplitude of the vibration pattern; and
   a head positioning controller configured to move the head position to the target position based on a result of addition by the adder.

2. The magnetic disk device of claim 1, wherein the vibration pattern detector is configured to detect the vibration pattern from the result of addition.

3. The magnetic disk device of claim 1, wherein the adder is configured to add an offset signal of a zero value if the vibration pattern detector detects no vibration pattern.

4. The magnetic disk device of claim 1, wherein the adder is configured to change a sign of the offset signal in response to a moving direction of the magnetic head over the magnetic disk.

5. A magnetic disk device comprising:
   a magnetic disk;
   a magnetic head configured to move over the magnetic disk;
   a vibration pattern detector configured to detect a vibration pattern of the magnetic head caused by vibration with respect to a position error signal that is based on a difference between a head position of the magnetic head over the magnetic disk and a target position on the magnetic disk; and
   a head positioning controller configured to move the head position to the target position based on amplitude of the vibration pattern, the target position being near a peak or a bottom of the position error signal.

6. A head position control method applied to a magnetic disk device comprising a magnetic disk and a magnetic head configured to move over the magnetic disk, the head position control method comprising:
outputting a position error signal indicating a difference between a head position of the magnetic head over the magnetic disk and a target position on the magnetic disk;
detecting a vibration pattern of the magnetic head caused by vibration;
adding the position error signal to an offset signal indicating amplitude of the vibration pattern; and
moving the head position of the magnetic head to the target position based on a result of addition at the adding.

* * * * *